United States Patent [19]

Schulze et al.

[11] 3,915,754

[45] Oct. 28, 1975

[54] GROWTH OF GALLIUM PHOSPHIDE

[75] Inventors: Richard G. Schulze, Hopkins; Paul E. Petersen, Minnetonka, both of Minn.

[73] Assignee: Honeywell Inc., Minneapolis, Minn.

[22] Filed: Nov. 29, 1973

[21] Appl. No.: 420,175

[52] U.S. Cl. ........... 148/1.5; 148/1.6; 252/62.3 GA; 357/14; 357/19; 23/301 R

[51] Int. Cl.[2] ........................................... H01L 7/34

[58] Field of Search ............... 148/1.6, 33, 171-173; 23/301 R, 301 SP; 252/62.3 GA; 357/14, 19

[56] References Cited

UNITED STATES PATENTS

| | | | |
|---|---|---|---|
| 3,278,342 | 10/1966 | John et al. | 148/1.6 |
| 3,502,884 | 3/1970 | Perlman et al. | 357/14 |
| 3,690,964 | 9/1972 | Saul | 148/171 |

*Primary Examiner*—G. Ozaki
*Attorney, Agent, or Firm*—David R. Fairbairn

[57] ABSTRACT

High resistivity n-type gallium phosphide suitable for photodetector applications is grown from a liquid solution of gallium, gallium phosphide, and copper.

10 Claims, 12 Drawing Figures

GROWTH OF GALLIUM PHOSPHIDE

REFERENCE TO CO-PENDING APPLICATIONS

Reference should be made to a co-pending application by P. E. Petersen and R. G. Schulze entitled "Gallium Phosphide Photodetector", Ser. No. 420,174 which was filed on even date herewith, and which is assigned to the same assignee as the present application.

BACKGROUND OF THE INVENTION

The present invention was made under a contract with the Department of the Air Force. The invention is concerned with the growth of gallium phosphide. In particular, the present invention is directed to a method of producing high resistivity n-type gallium phosphide for use as a high speed, high sensitivity photodetector.

There has been considerable interest over many years in sensitized photoconductors. The class of photoconductor materials most studied is the IIB-VIA group, especially cadmium sulfide (CdS). A sensitized photoconductor is one having electronically active centers which are present in the photoconductor. These electronically active centers serve to enhance the majority carrier lifetime in comparison to the unsensitized photoconductor material.

A problem that has limited the usefulness of the sensitized mode of photoconductivity is the relatively long response time. In fact, the response time is generally much longer than the majority carrier lifetime. The inevitable presence of additional centers which act as majority carrier traps is responsible. It is generally believed that in many of the IIB-VIA compounds the majority carrier traps are native defects. In other words, the majority carrier traps are deviations from stoichiometry which are present in concentrations of the order of $10^{18}cm^{-3}$.

The IIIA-VA compounds such as gallium arsenide (GaAs) and gallium phosphide (GaP) have also shown sensitized photoconductivity. The higher order of covalent bonding, greater hardness, and availability of amphoteric conductivity in IIIA-VA compounds point to a smaller likelihood of self generated stoichiometric defects than occur in self-compensating IIB-VIA compounds like cadmium sulfide. Large ratios of response time to lifetime, however, have been observed even in the IIA-VA compounds.

Compared to cadmium sulfide and other IIB-VIA compounds, much less work has been done on the photoconductive properties of gallium phosphide. Previous work has shown, however, that copper can act as a photosensitization center in gallium phosphide, yielding photoconductive gains as high as $10^4$ but with long response times.

Early work on gallium phosphide produced relatively high conductivity gallium phosphide. J. W. Allen and R. J. Cherry, *J. Phys. Chem. Solids*, 23, 509 (1962) were the first to report the production of very high resistivity gallium phosphide by diffusing copper into n-type crystals. Since p-type crystals could not be converted to high resistivity with the same method, they deduced that copper was an acceptor in gallium phosphide. They reported its energy location as 0.68 eV above the valence band on the basis of resistivity versus $1/T$ measurements. Superlinear and sub-linear photoresponses were observed as well as infrared quenching.

H. G. Grimmeiss and H. Scholz made the first extensive study of the copper-doped gallium phosphide system. Their work was described in *Philips Res. Reports*, 20, 107 (1965), and in U.S. Pat. Nos. 3,261,080 and 3,412,252. Grimmeiss and Scholz reported very good sensitivity values, measuring a $\mu\tau$ product under some conditions of photoexcitation as high as 0.1, which is on a par with cadmium sulfide. The $\mu\tau$ product, which is the product of the mobility $\mu$ and the lifetime $\tau$ of an untrapped carrier, is of importance since the photoconductive gain is proportional to the $\mu\tau$ product. The dark resistivity in the more completely compensated of the two n-type materials studied by Grimmeiss and Scholz was approximately $10^9$ohm cm. At excitation levels producing less than $10^{14}$ free carriers $cm^{-3}$ using 2.5 eV radiation, a linear photoresponse with respect to intensity was measured. Free carrier excitation between about $10^{14}$ and $10^{16}cm^{-3}$ produced a superlinear behavior, while higher excitation levels again gave a linear response. Grimmeiss and Scholz reported no response time measurement.

B. Goldstein and S. S. Perlman, *Phys. Rev.*, 148, 715 (1966) elaborated on and confirmed many of the previous results in copper-doped gallium phosphide. Their material was higher resistivity, being as high as $10^{14}$ohm cm. Photoconductive gains greater than $10^4$ were reported by Goldstein and Perlman, derived from a $\mu\tau$ product of approximately 1. They observed very long response times of the order of minutes in some cases which they attributed to the slow thermal emptying of a deep (0.6 eV) electron trapping level with a density of $3\times10^{13}cm^{-3}$.

More recent work on copper-doped gallium phosphide by D. L. Bowman, *J. Appl. Phys.*, 38, 568 (1967) includes photo-Hall measurements as a means of substantiating the hole capture and sensitizing properties of the copper center. The location of the copper acceptor was determined to be 0.66 eV from activation energy plots of the linear-to-superlinear and superlinear-back-to-linear photoconductivity transitions. The photoconductive lifetime was measured under light conditions where the effects of the copper sensitizing centers and any other deep traps or recombination centers were saturated (i.e., $\tau_n = \tau_p$). The value reported is $\sim 6\times10^{-6}$ sec, which is substantially greater than that reported by D. F. Nelson et al., *Phys. Rev.*, 135, A1399 (1964). Bowman used lower energy radiation, 2.23 eV, which is approximately equal to the minimum indirect bandgap of gallium phosphide.

All of this previous work on copper-doped gallium phosphide was done on vapor grown gallium phosphide material. The copper was diffused into the gallium phosphide subsequent to growth. Although one U.S. Pat. No. 3,502,884 by S. S. Perlman and B. Goldstein suggests that the copper may be introduced during growth of the crystal (column 3, lines 23 and 24), no work has been reported on alternative methods of copper doping gallium phosphide. As previously discussed, the copper-doped vapor grown gallium phosphide materials have yielded photoconductive gains as high as $10^4$, $\mu\tau$ products as high as 1, and high resistivity. The materials have also, however, exhibited long response times (as long as several minutes). These materials have not, therefore, solved the need for a wide bandgap photodetector having high sensitivity and high speed.

SUMMARY OF THE INVENTION

In the present invention, high resistivity, n-type gallium phosphide is produced by forming a liquid solution of gallium, gallium phosphide, and copper, and producing supersaturation and growth of copper-doped gallium phosphide from the liquid solution. Copper-doped gallium phosphide crystals formed by this method have exhibited $\mu\tau$ products which are higher and response times which are shorter than those reported in the prior art.

DESCRIPTION OF THE PREFERRED EMBODIMENTS

Solution Growth of Copper-Doped Gallium Phosphide

The solution growth technique of the present invention has successfully produced high resistivity, n-type gallium phosphide having high photoconductive gains and high speed. The method involves forming a liquid solution of gallium, gallium phosphide, and copper. Supersaturation and growth of copper-doped gallium phosphide from the liquid solution is then produced.

Figure 1:
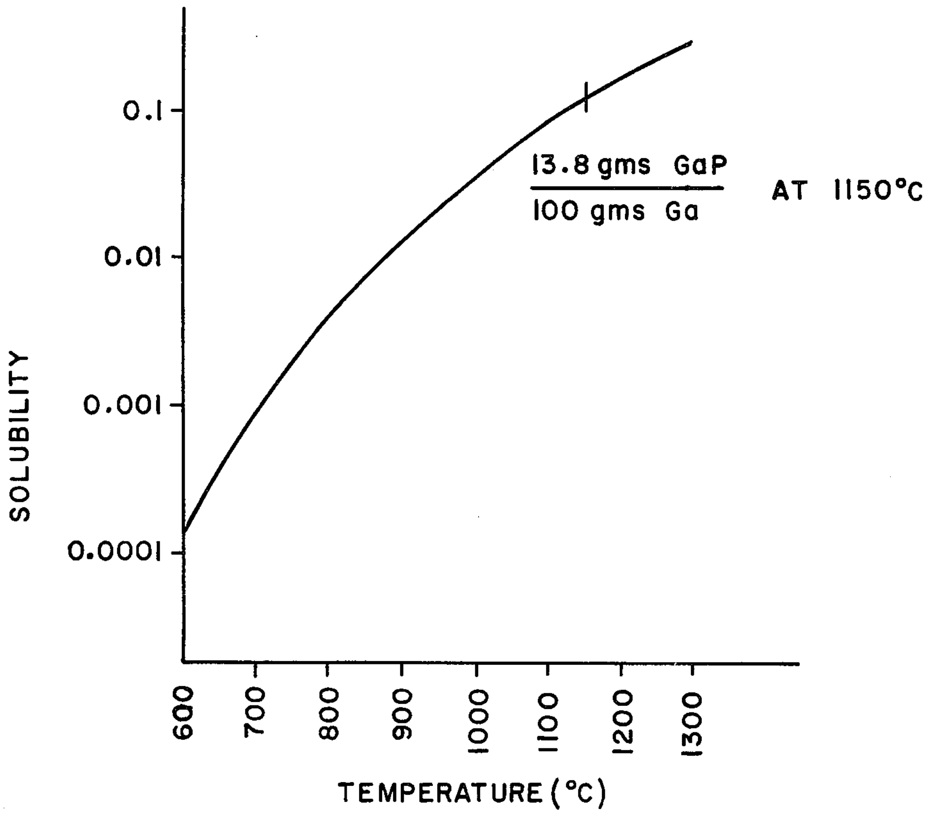
FIG. 1 is a graph of the solubility of gallium phosphide in gallium as a function of temperature.

The liquid solution is formed by dissolving gallium phosphide and copper in gallium. The solubility of gallium phosphide in gallium, which is shown in FIG. 1, is after C. D. Thurmond, *J. Phys. Chem. Solids*, 26, 785 (1965). Enough gallium phosphide must be added to the selected quantity of gallium to saturate the solution at the upper or starting temperature.

The supersaturation and growth of copper-doped gallium phosphide from the liquid solution may be achieved by a variety of techniques including: (1) uniform cooling of the solution with growth at random nucleation sites, (2) establishing a temperature gradient in the liquid solution, (3) liquid phase epitaxy, and (4) encapsulated Czochralski growth. The first technique, which is the easiest of these techniques to implement, was selected to determine the feasibility of solution growth of copper-doped gallium phosphide.

Figure 2:
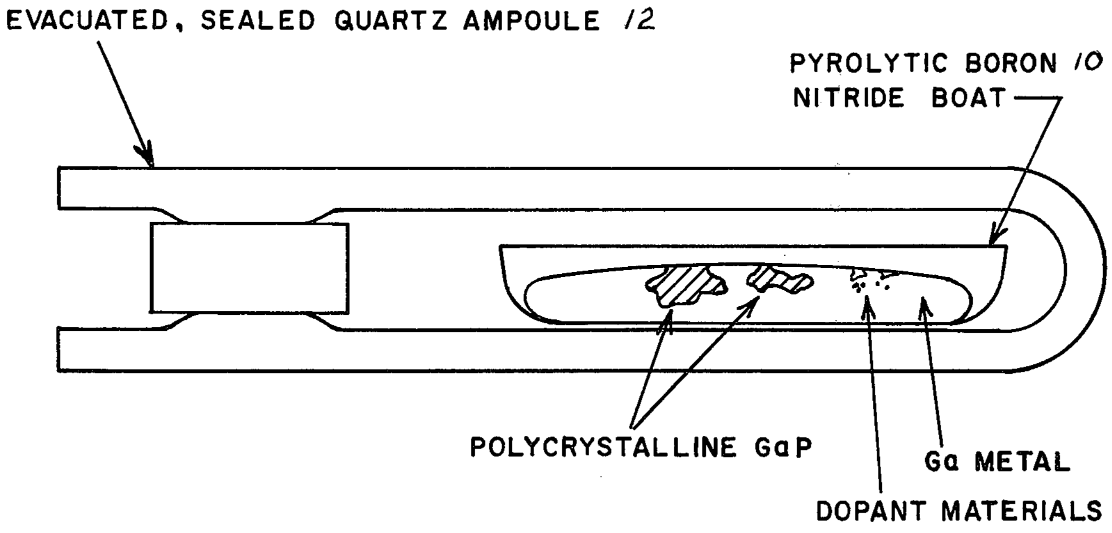
FIG. 2 is a schematic view of a growth ampoule used for solution growth of gallium phosphide.

FIG. 2 shows a schematic view of the growth ampoule used for solution growth of gallium phosphide. The gallium, gallium phosphide, and copper are placed in the pyrolytic boron nitride boat 10. The quartz ampoule 12 is evacuated, baked out at 400°C, and sealed. Ampoule 12 is placed in a heavy wall nickel tube along with a thermocouple. The furnace temperature profile is flat to a few tenths of a °C.

The ampoule 12 containing boat 10 is heated to the starting temperature, which is determined by the amount of gallium phosphide in the gallium solvent. After an appropriate wait at the starting temperature to ensure complete dissolution of the gallium phosphide (and copper) in the gallium, the cool down starts. The cooling is done at a controlled rate to a predetermined final growth temperature.

This solution growth process was used to grow both undoped and copper-doped gallium phosphide crystals. The initial growth runs were undoped for the purpose of assessing both the starting materials and the growth procedures. The starting temperature for these undoped growth runs ranged from 950°C to 1150°C, and the final growth temperatures ranged from 800°C to 1100°C. The cool down rates ranged from 0.7°C per hour to 4°C per hour.

Hall effect and resistivity measurements on the undoped gallium phosphide crystals showed a residual donor concentration in the low $10^{15}cm^{-3}$ range and an electron mobility of about $150cm^2/V$ sec. These figures compare well with the best data previously reported in the literature for undoped gallium phosphide. The crystals grown were low resistivity n-type.

From the undoped crystal growth runs, the preferred growth conditions for copper-doped gallium phosphide growth were determined. The preferred upper or starting temperature was determined to be 1150°C. A higher temperature would cause the quartz ampoule to soften. A lower temperature, on the other hand, reduces the amount of gallium phosphide that can be dissolved and thus limits the size of the resulting gallium phosphide crystals. In addition, our experimental data indicates that an increase in gallium inclusions in the crystals results when a lower starting temperature is used.

The preferred cool down rate was 0.7°C per hour. This cool down rate produced a smaller amount of gallium metal inclusion than did the higher cool down rate. Slower cool down rates probably would offer no advantage since 0.7°C per hour is very close to the time stability of the furnace control.

A typical growth charge used for growth of copper-doped gallium phosphide was 13.8 grams of gallium phosphide and 100 grams of gallium. This ratio of gallium phosphide to gallium should result in a saturated solution at the desired starting temperature of 1150°C. In fact, some gallium phosphide was undissolved at 1150°C. This may be due to a slight inaccuracy in the solubility curve of FIG. 1, or may be due to a change in the solubility due to the amount of copper which is added to the solution.

The starting temperature for growth was 1150°C and the final temperature was between about 1100°C and about 1140°C. The preferred cool rate was 0.7°C per hour. In the temperature range from 1150°C to 1100°C, approximately 35% (about 5 grams) of gallium phosphide precipitates from the solution.

The starting materials were obtained from a variety of sources. The gallium metal was 6 or 7–9's (99.9999% or 99.99999%) purity from one of several sources, including Eagle-Picher Industries Inc. The gallium phosphide was a polycrystalline, porous form obtained from Monsanto Company, and the copper was 5–9's grade from Materials Research Corporation. The pyrolytic boron nitride boat was supplied by Union Carbide Corporation.

There was no information in the literature on the solubility of copper in gallium phosphide, nor has any work previously been reported on the copper-doping of gallium phosphide during solution growth. It was necessary, therefore, to determine the copper concentration in the solution which is required to partially compensate the residual donor concentration and produce high resistivity n-type gallium phosphide. It was discovered that an unusually large percentage of copper in the growth charge was necessary to provide the necessary compensation. Additions of copper of less than 2 mole percent of the total growth charge were found to produce virtually no change in the electron concentration of the gallium phosphide crystal. Additions of copper greater than 5 mole percent converted the gallium phosphide to p-type conductivity.

Figure 3:
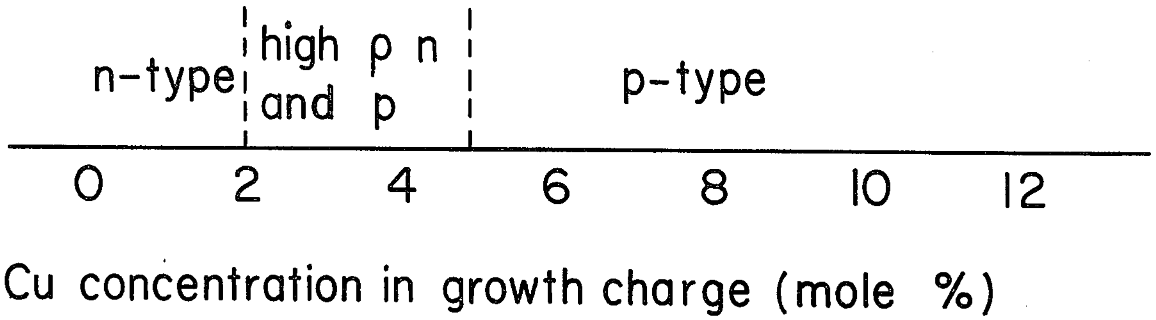
FIG. 3 is a graph of conductivity type and resistivity as a function of copper concentration in the growth charge.

Efforts to converge on the exact amount of copper within the 2 to 5 mole percent range did not produce entirely consistent results. In this range the crystals varied from p-type to low resistivity n-type. These results are illustrated in FIG. 3. Closely compensated n-type crystals, however, have been produced with resistivity up to $10^{11}$ohm cm. The fact that it is possible to get material compensated to closer than 1 part in $10^9$ suggests that an autocompensation mechanism is operative. Either the purity of the polycrystalline gallium phosphide starting material or some unknown aspect of the growth procedure apparently varied sufficiently to preclude complete control of the resistivity in the 2 to 5 mole percent range.

Some of the copper-doped gallium phosphide crystals exhibited n-type surfaces with p-type interiors, and still other crystals exhibited low resistivity n-type surfaces with high resistivity n-type interiors. This indicates that the cool down produces doping gradients. The rather short temperature interval from 1150°C to 1100°C was selected to minimize the effects of inhomogeneous doping due to a temperature dependence of the copper dopant solubility. The short range does not, however, eliminate the problem entirely.

Figure 4:
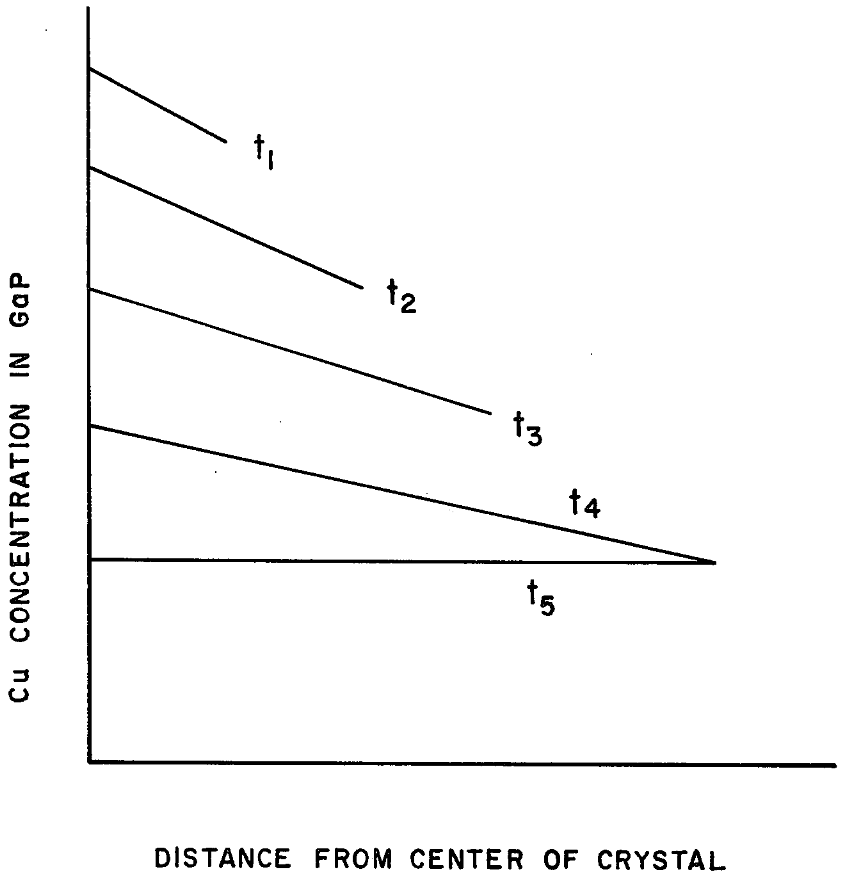
FIG. 4 is a graph of copper concentration in gallium phosphide as a function of distance from the center of the gallium phosphide crystal for various times.

FIG. 4 is a schematic representation of doping distribution one might expect with a temperature dependent dopant solubility. The upper curve $t_1$, shows a doping distribution from the center of a growing crystal after it has grown to a dimension $x_1$ from the center. At some later time represented by curve $t_2$, the growth has advanced the crystal surface to dimension $x_2$ from the center. The assumption that diffusion effects are operative and that the dopant solubility is decreasing with decreasing temperature accounts for each succeeding curve being lower and all the curves having a negative slope. Curve $t_4$ represents the doping profile one might expect in a crystal which has grown to distance $x_4$ and then is quenched to room temperature.

Since the final growth temperature, 1100°C, is quite high in the present method, one might hope that a post-growth anneal at that temperature would level out doping gradients. This is illustrated by curve $t_5$. Assuming the copper has a diffusion coefficient in gallium phosphide which is similar to that of zinc at 1100°C, a time of four days would yield a diffusion distance of 1 mm. For that reason, a four day post-growth anneal of the crystals and the liquid solution at 1100°C was used to reduce dopant gradients in the copper-doped gallium phosphide crystals. Observation of the crystals grown using the post-growth anneal indicated that it was effective in reducing doping gradients.

Detector Fabrication

Photoconductive detectors were formed from high resistivity n-type gallium phosphide that has been grown from a liquid solution of gallium, gallium phosphide, and copper. Some of the crystals exhibited n-type conductivity throughout the crystal. Other crystals exhibited p-type conductivity in the interior portions and high resistivity n-type conductivity in the exterior portions. Detectors were made from the n-type portion of both types of crystals.

Some of the detectors were formed on gallium phosphide crystals whose surface had been prepared by lapping and etching. The gallium phosphide crystals were lapped on two sides using 3.0 microns alumina on glass. After lapping, the crystals were cleaned with a mix of acetone:toluene:methanol and then with detergent and water. The crystals were then etched in a solution of $HCl:H_2O:HNO_3$ until all evidence of the lapping was gone. Crystals were then rinsed in deionized distilled water and blown dry.

Other detectors were formed on "as-grown" surfaces. In other words, electrical contacts were made on an exterior surface of the crystal which had not been lapped, polished, etched, or otherwise modified.

Electrical contacts were made to the gallium phosphide crystals by depositing 600 to 700 A of Ag: 1%Te followed by a 500 to 600 A layer of nickel. The evaporated layers were then heat treated at 680°C in a hydrogen atmosphere. Photo and dark current-voltage (I–V) measurements indicated that these metal contacts made good ohmic contact to the high resistivity n-type gallium phosphide. The linearity of the I–V characteristics was sufficient to ensure that contact effects were minimal and that the conductivity was controlled by bulk mechanisms.

Figure 5:
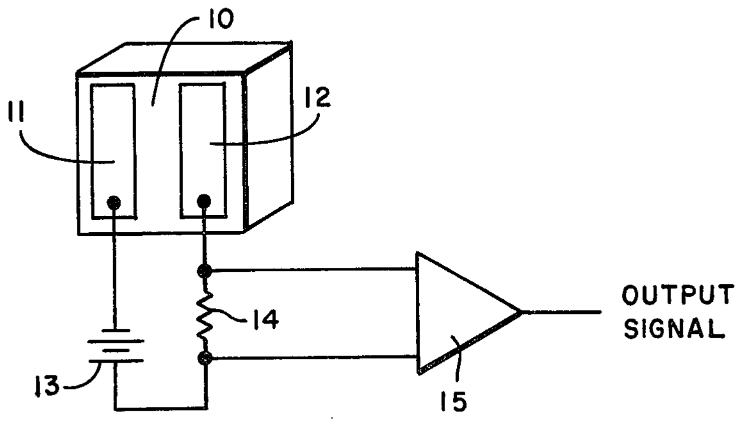
FIG. 5 shows a copper-doped gallium phosphide detector.

FIG. 5 shows a typical copper-doped gallium phosphide detector fabricated by this method. Attached to one surface of copper-doped gallium phosphide body 10 are electrical contacts 11 and 12. The detector is connected in series with battery 13 and load resistor 14. The resistance $R_d$ of the detector is much greater than the resistance $R_l$ of load resistor 14. The detector, therefore, is operating in the constant voltage mode. Amplifier 15 amplifies the voltage across load resistor 14 to produce an output signal.

Spectral Response

The spectral response of a photoconductor, i.e., the dependence of the photosignal on the wavelength of the excitation radiation, is one of the most important parameters of a photoconductor, both from a practical and from a fundamental view point. The low energy (long wavelength) cutoff of the photoconductive response is dependent upon the semiconductor band structure. If the density of the impurity states is low, extrinsic photoconductivity (excitation from an impurity site to a hole or electron band) should be low. The low energy cutoff should then be determined by the intrinsic (band-to-band) processes, and in fact should nearly equal the minimum energy gap. Gallium phosphide has the minimum indirect bandgap of 2.24 eV and a minimum direct bandgap of 2.8 eV.

Figure 6:
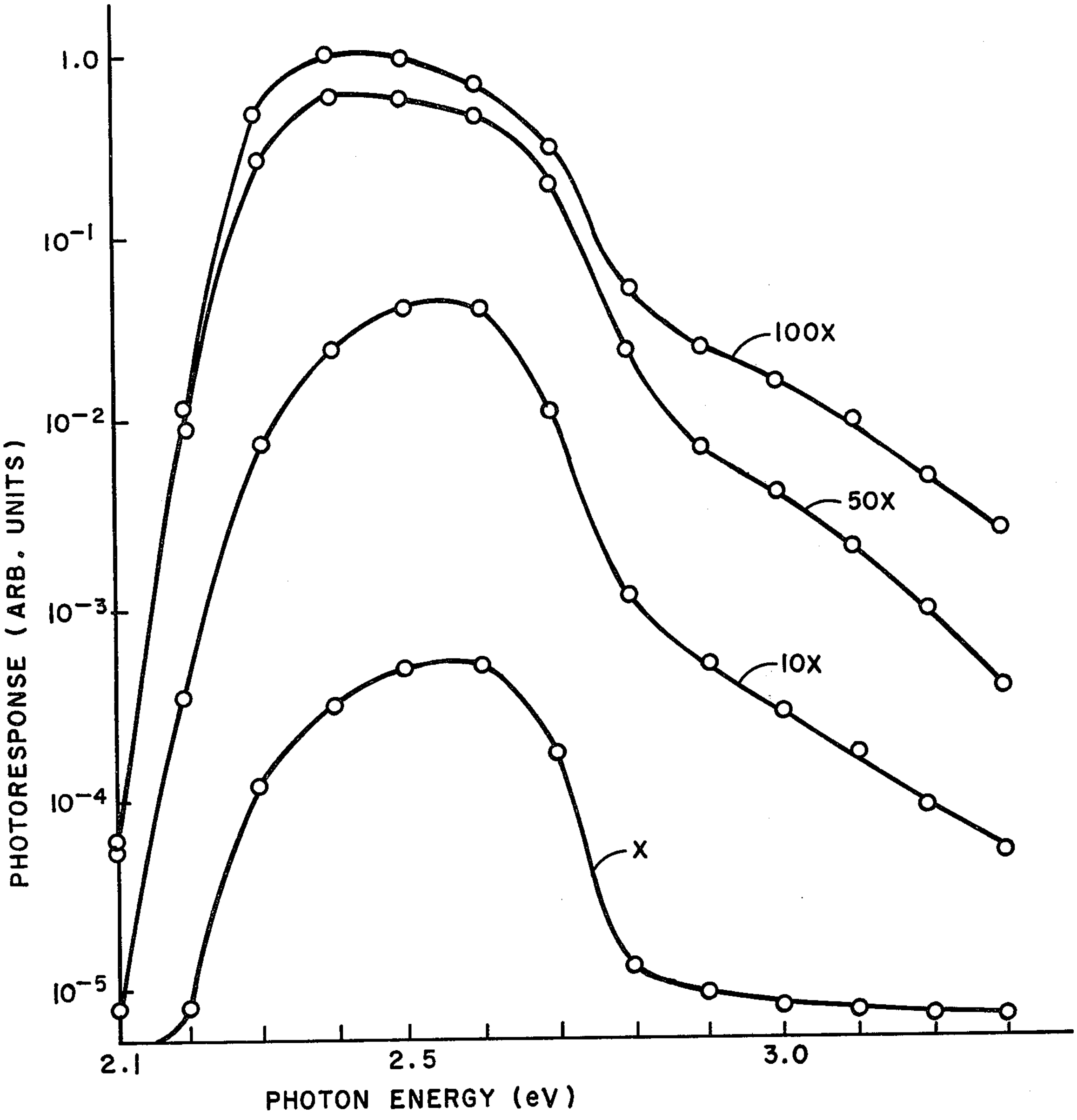
FIGS. 6 and 7 show the spectral response of a copper-doped gallium phosphide detector measured at 300°K and 86°K, respectively.

FIG. 6 shows the direct current (dc) spectral response of a typical high resistivity copper-doped gallium phosphide crystal measured at 300°K with various radiation intensities. The surface on which these measurements were made was an interior surface which was prepared by the lapping and etching techniques described above. In FIG. 6, and in later figures, the notation "X" represents a radiation flux intensity of $5\times10^{11}$photons/cm$^2$, which corresponds to $1.7\times10^{-7}$watt/cm$^2$. The notation 10X implies a radiation flux intensity which is 10 times higher than X, and so on.

The rather soft edge in the spectral response around 2.25 eV in FIG. 6 corresponds to the indirect bandgap of gallium phosphide. The softness of the edge is due to the fact that the transition involved is indirect (in momentum space) and hence must be phonon assisted. The shape of the spectral response curve is to a first approximation independent of the radiation intensity. The photoconductive gain at the peak of the curve for the lowest intensity was approximately 100. It should also be noted that the photoconductive gain increases superlinearly with light intensity.

The high energy cutoff of the spectral response is most likely the result of surface recombination. As the energy of the radiation is increased, the absorption occurs nearer to the surface. The surface is less perfect than the bulk material and hence has a greater density of recombination centers with a corresponding decrease in the free electron lifetime. FIG. 5 shows that this cutoff occurs around 2.8 eV for this typical sample.

Figure 7:
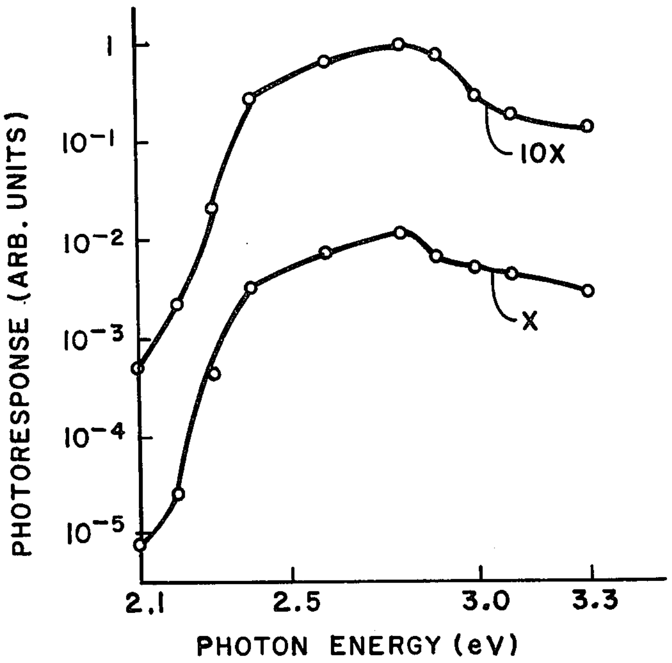

FIG. 7 shows the spectral response of the same sample measured at 86°K. The peak response occurs near 2.8 eV, which is the direct bandgap in gallium phosphide. Unlike the indirect transition at 2.25 eV, this direct transition requires no lattice participation. The leading edge, which is due to the phonon assisted indirect transition, is now broadened. This is most likely the result of the temperature dependence of the phonon spectrum. It is believed that the enhancement of the response at high energy is due to a decrease in the surface recombination velocity with temperature.

Figure 8:
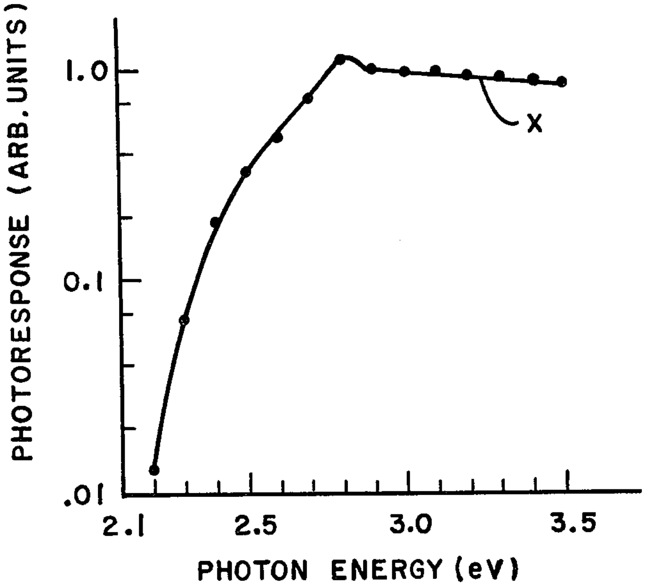
FIG. 8 shows the spectral response of a copper-doped gallium phosphide detector formed on an as-grown surface.

The spectral response at 300°K of a copper-doped gallium phosphide photoconductor formed on an as-grown surface is shown in FIG. 8. Once again the spectral response peaked near the direct band edge. Unlike the detectors formed on lapped and etched surfaces, however, the spectral response remained nearly flat out to the limits of the experimental apparatus. This is the broadest spectral response reported for gallium phosphide. These results suggest that the detectors formed on as-grown surfaces are significantly better than detectors formed on the polished and etched surfaces in that the surface recombination rate of as-grown surfaces is very low. Further discussion of the high energy response of as-grown gallium phosphide surfaces is contained in the previously mentioned co-pending application Ser. No. 420,174 by P. E. Petersen and R. G. Schulze, which was filed on even date with this application.

Photoconductive Gain Versus Illumination Intensity

Our investigations have revealed that the addition of copper in the gallium-gallium phosphide liquid solution has two major effects on the resulting gallium phosphide crystal. First, copper compensates the gallium phosphide. In the undoped state, there is a residual free electron concentration on the order of $10^{15}$cm$^{-3}$. When copper is added, these free electrons become bound to the resulting deep centers, and the resistivity can be increased by many orders of magnitude.

Second, copper acts to sensitize the gallium phosphide material. In other words, the presence of a copper dopant increases the photosensitivity of the gallium phosphide. An increase in photosensitivity essentially implies an increase in the majority carrier (in this case the electron) lifetime.

The effect of copper in gallium phosphide was studied by observing the direct current (dc) photosignal as a function of the illumination intensity. It is essential that these measurements be made in the direct current mode because the response time of the material can also be dependent on the illumination intensity. Monochromatic radiation of 2.6 eV was used in these measurements, and the intensity was adjusted by changing a neutral density filter in the path of the radiation.

Figure 9:
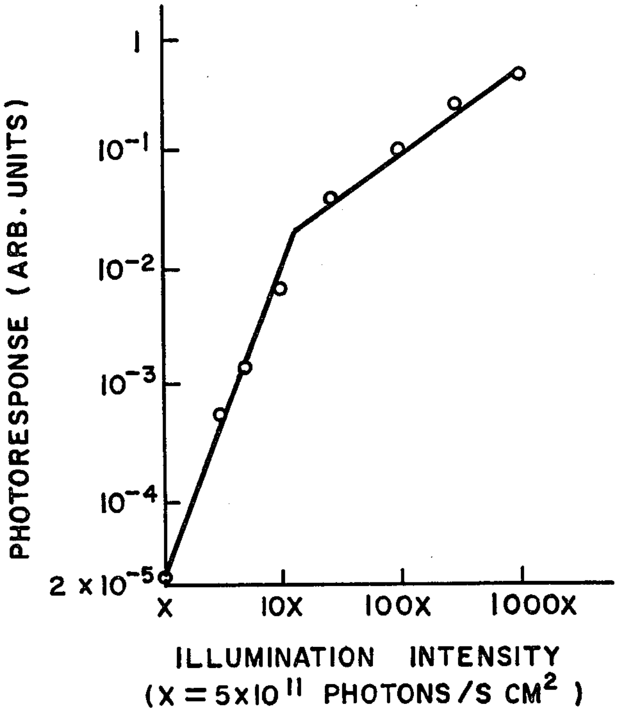
FIG. 9 shows the direct-current (dc) photosignal of a copper-doped gallium phosphide detector as a function of illumination intensity.

FIG. 9 shows the results of these measurements. For radiation intensities less than 20X, the photoresponse increases as the square of the illumination intensity. As the intensity is further increased, the photoresponse makes a transition to a near linear behavior. It is believed that a second transition to linear behavior occurs as the radiation intensity is reduced below the level of X.

Response Time

One characteristic of many photoconductors which respond to visible radiation is that the photoconductive response is limited by majority carrier traps. As a result, the response times are typically seconds or longer. In the first approximation, the presence of majority carrier traps does not affect the steady state level of photoexcitation, but it does have a strong influence on the time dependence of the approach to steady state. Sometimes the effects of majority carrier traps are eliminated by irradiating the sample with an amount of bias radiation sufficient to keep the majority carrier traps fully occupied. In the following experiments on copper-doped gallium phosphide, however, no bias radiation was used to reduce response time.

Figure 10:
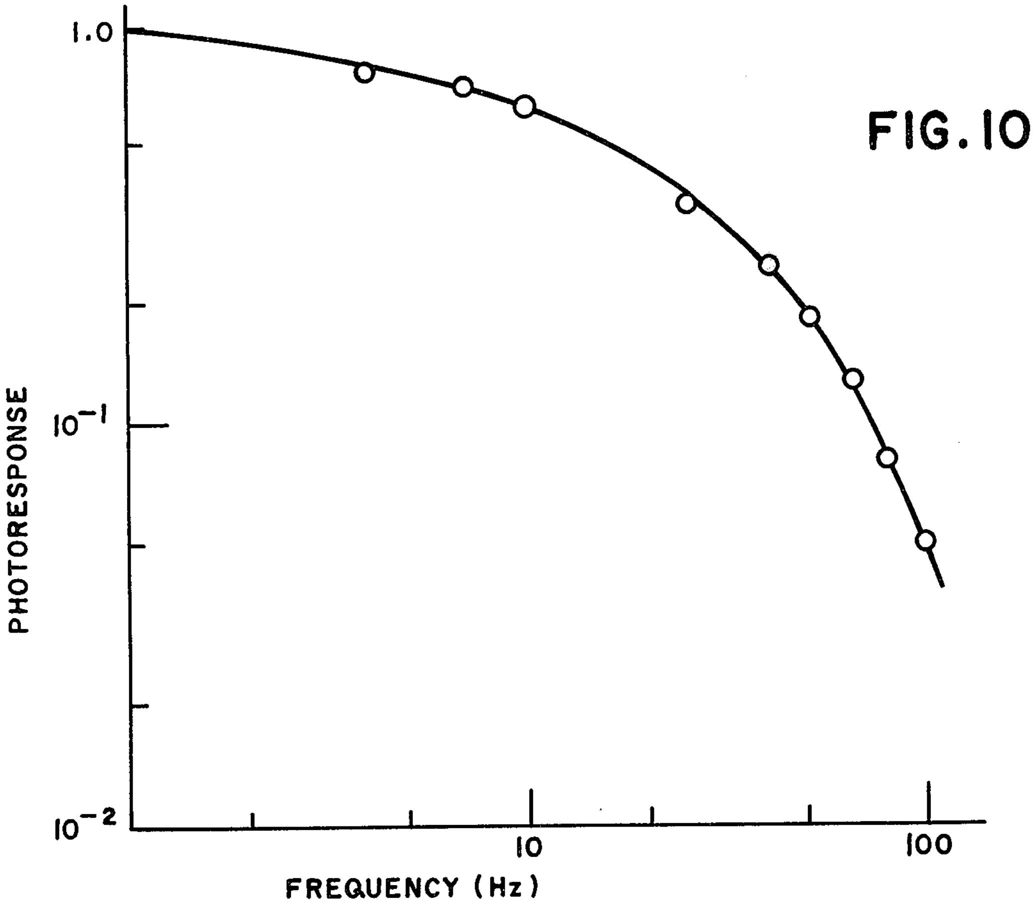
FIG. 10 shows the photoresponse of a copper-doped gallium phosphide detector as a fuction of frequency.

FIG. 10 shows the dependence of the photoresponse on the chopping frequency of a modulated radiation source. The intensity of the source was "X" ($5\times10^{11}$photons/cm$^2$ sec). The copper-doped gallium phosphide detector had a contact spacing of 0.001 inches, and the applied field intensity was $4\times10^3$V/cm. The photoconductive gain at the low frequency plateau was $3.3\times10^3$.

It can be seen from FIG. 10 that the response curve does not fall off as $1/f$ at high frequency. It is still possible, however, to define a response time $\tau_0$. Response time $\tau_0$ is equal to $1/\omega_0$, where $\omega_0$ is the angular frequency at which the signal is reduced to 0.707 of its dc value. From the photoresponse shown in FIG. 9, $\tau_0$ is $2.6\times10^{-2}$sec. A response time this short implies that the effects of majority carrier trapping are not severe in copper-doped gallium phosphide grown by the method of the present invention. This time response is typical of copper-doped gallium phosphide grown by this method.

Figure 11:
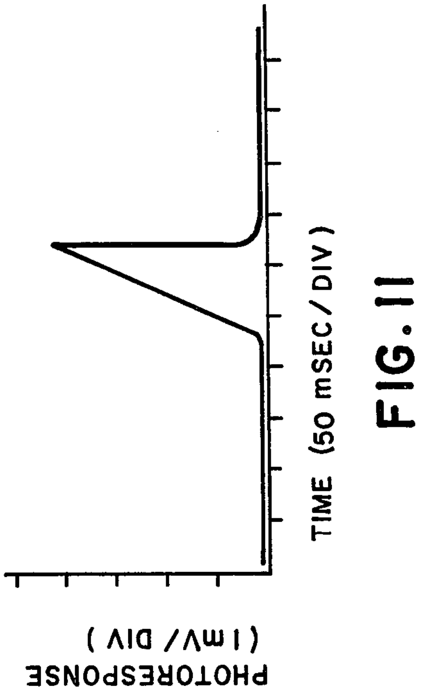
FIG. 11 shows the photoresponse as a function of time of a copper-doped gallium phosphide detector.

FIG. 11 shows the photoresponse as a function of time for a copper-doped gallium phosphide detector. The detector was allowed to sit for approximately 85 hours in total darkness. The detector was then exposed to a 100 millisecond light pulse of $1.3\times10^{13}$photons/$cm^2$sec. The photon energy of the pulse was 2.8 eV. The fast decay on the trailing edge of the response is indicative of the absence of deep majority carrier traps.

Figure 12:
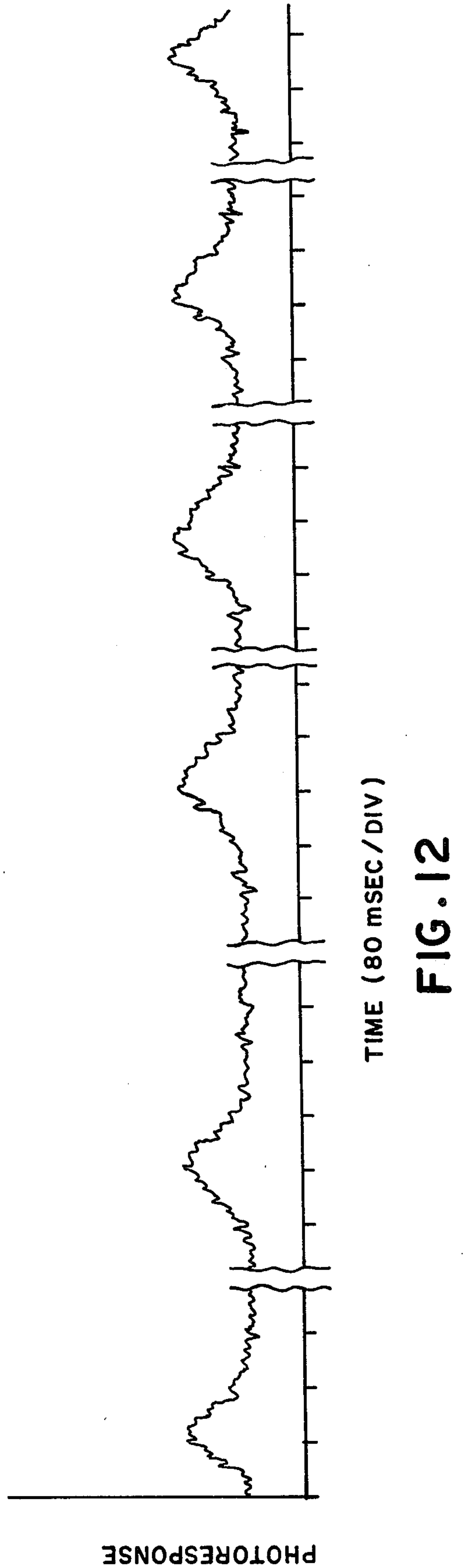
FIG. 12 shows the photoresponse of a copper-doped gallium phosphide detector to repeated spot scans.

In the part, low level visible spectrum radiation detectors such as cadmium sulfide have required the use of background illumination to suppress the influence of majority carrier traps. FIG. 12 shows the advantage of solution grown copper-doped gallium phosphide for low level visible spectrum detection. A copper-doped gallium phosphide detector was maintained in darkness for 16 hours. The detector was then repeatedly scanned with a 13 micron diameter spot of 2.84 eV radiation at a 0.625 millimeter/second transit speed. The total power in the 13 micron spot was $5\times10^{-13}$watt. No background illumination was used. The fast response shown in FIG. 12 demonstrates the usefulness of this detector for applications such as star sensing for space vehicle attitude reference systems.

Summary of Detector Properties

In order to fully evaluate the detector properties of copper-doped gallium phosphide grown from liquid solution, it is necessary to compare the measured properties with those reported in earlier references. Three references which describe the photoconductive properties of vapor grown copper-doped gallium phosphide are Goldstein and Perlman, *Physical Review*, 148, 716 (1966); Grimmeiss and Scholz, *Philips Research Report*, 20, 107 (1966); and Bowman, *Journal of Applied Physics*, 38, 568 (1967). The photoconductive copper-doped gallium phosphide prepared by the method of the present invention appears to have substantially improved properties. Grimmeiss and Scholz mention on page 109 that $\mu\tau$ can be larger than 0.1. Goldstein and Perlman indicate a $\mu\tau$ of about unity and a photoconductive gain which in some cases exceeded $10^4$ for fields of $10^3$V/cm. Neither Grimmeiss and Scholz nor Goldstein and Perlman indicates the light level at which the measurements were made. Bowman does indicate that his measurements were made at between $10^{13}$ and $10^{16}$photons/$cm^2$sec.

Typical high resistivity n-type gallium phosphide samples grown by the method of the present invention have exhibited photoconductive gains of about $10^3$ at fields of 6500 V/cm. Photoconductive gains as high as $5\times10^6$ and $\mu\tau$ as high as 50 have been observed at fields of 780 V/cm. It is significant that these measurements were made at a very low light level ($5\times10^{11}$photons/$cm^2$sec., which corresponds to a $1.6\times10^{-7}$watts/$cm^2$) and that the detectors exhibited a response time of a few milliseconds. This response time is significantly shorter than response times which have been previously reported for gallium phosphide.

Conclusion

High sensitivity, high speed gallium phosphide photodetectors have been formed from gallium phosphide grown by the method of the present invention. Some samples have exhibited photoconductive detector properties which are substantially improved over properties exhibited by prior art material.

While this invention has been disclosed with reference to preferred embodiments, it should be understood by those skilled in the art than changes in form and detail may be made without departing from the spirit and scope of the invention.

The embodiments of the invention in which an exclusive property or right is claimed are defined as follows:

1. A method of producing high resistivity, n-type gallium phosphide comprising:
- forming a liquid solution of gallium, gallium phosphide, and copper; and
- producing supersaturation and growth of copper-doped gallium phosphide from the liquid solution.

2. The method of claim 1 wherein the amount of copper in the liquid solution is greater than about 2 mole percent.

3. The method of claim 2 wherein the amount of copper in the solution is less than about 5 mole percent.

4. The method of claim 1 wherein forming a liquid solution comprises heating gallium, gallium phosphide, and copper to a starting temperature of about 1150°C.

5. The method of claim 4 wherein producing supersaturation and growth comprises cooling the liquid solution to a final growth temperature of about 1100°C to about 1140°C.

6. The method of claim 5 wherein the cooling is at a rate of less than about 4°C per minute.

7. The method of claim 6 wherein the cooling is at a rate of about 0.7°C.

8. The method of claim 5 and further comprising maintaining the liquid solution at the final growth temperature for about four days.

9. A body of high resistivity, n-type gallium phosphide grown by the method of claim 1.

10. A photodetector comprising:
- a body of high resistivity, n-type gallium phosphide grown from a liquid solution of gallium, gallium phosphide, and copper; and
- electrode means for deriving an electrical signal from the body in response to electromagnetic radiation incident upon the body.

* * * * *